Jan. 6, 1925.
C. C. McDERMOTT
THERMOSTATIC RADIATOR CONTROL
Filed Aug. 26, 1922
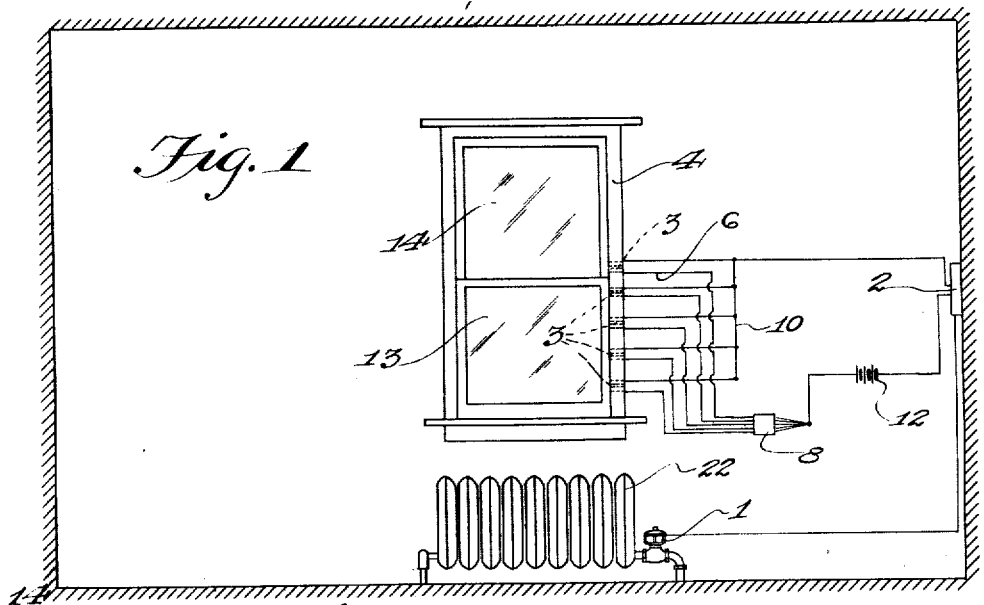
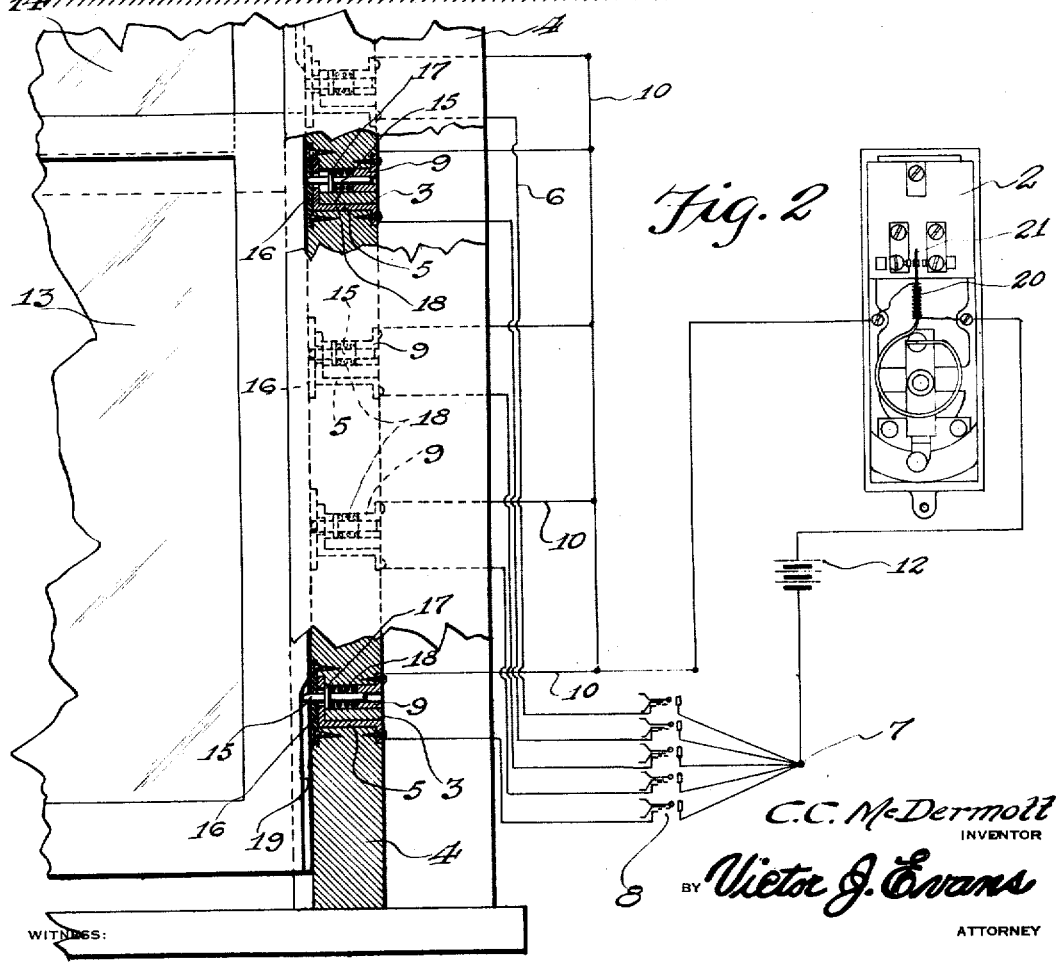

Patented Jan. 6, 1925.

1,521,693

UNITED STATES PATENT OFFICE.

CHARLES C. McDERMOTT, OF CHICAGO, ILLINOIS.

THERMOSTATIC RADIATOR CONTROL.

Application filed August 26, 1922. Serial No. 584,421.

*To all whom it may concern:*

Be it known that I, CHARLES C. McDERMOTT, a citizen of the United States, residing at Chicago, in the county of Cook and State of Illinois, have invented new and useful Improvements in Thermostatic Radiator Controls, of which the following is a specification.

This invention relates to controls for heating radiators, and an object of the invention is to provide a window operated thermostatic control for automatically shutting off the passing of a heating agent through a radiator when the window is open, and which will permit the passing of the heating agent through the radiator when the window is closed.

In hotels, office buildings, rooming houses and apartments, as well as dwellings, when the room becomes too hot the occupant opens the window and when the window is opened for cooling off the room it places an extra burden upon the heating system of the building causing practically the heating of the out doors and consequently requiring the use of a greater amount of fuel and the needless waste of heat, and it is an object of this invention to provide a structure for overcoming this needless waste of heat, by cutting off the passage of the heating agent through the radiator when the window is open, and then when the room is sufficiently cooled the natural instinct of the occupant will cause him to close the window at which time the radiator valve will be reopened to permit the heating agent to pass through the radiator.

According to my present invention I provide means for conserving the heat which would otherwise be lost when a ventilating device such as a window is made active and puts an artificial demand upon the heating device or heat supplying means. There is no advantage in attempting to supply heat to the room if the rate of loss exceeds a pre-determined value. That is to say, if the ventilating device such as the window is put into operation and its effect is such as to dissipate the heat needlessly or at too great a rate, the heating device might just as well be cut off as soon as the ventilating device is put into operation. My present invention provides a novel method of and means for accomplishing this result.

A further object of this invention is to provide a structure as specified in which a plurality of circuit closers are carried by the window structure and are connected, through a plug switch with a thermostat which in turn controls a valve of approved construction which controls the passage of the heating agent through the radiator.

Other objects of the invention will appear in the following detailed description taken in connection with the accompanying drawing wherein:

Fig. 1 is a diagrammatic view illustrating the application of the improved system or control mechanism.

Fig. 2 is an enlarged view partly in section illustrating the circuit closers and their wiring connection with the thermostat.

Referring more particularly to the drawings, the improved radiator-control comprises, in combination with a thermostatically controlled valve 1, of approved type, such as can now be purchased on the open market, a thermostat structure 2 also of approved type and purchasable on the open market, a plurality of circuit closers generically indicated by the numeral 3 and which are carried by the window frame 4.

The circuit closers 3 comprise contact plates 5 which are connected by suitable electric conducting wires 6 with one terminal 7 of a plug switch structure 8. A contact sleeve 9 is embodied in each of the circuit closers 3 and these sleeves are connected by suitable electric conducting wires 10 with the plug switch structure 8, thereby permitting the cutting in of anyone or all of the circuit closers 3 in circuit with the thermostat 2 and battery or other energizing source 12. The circuit closers 3 are placed at pre-determined spaces along the height of the window frame 4, a plurality of them being provided for use in connection with the lower sash 13 and one with the upper sash 14 so that the operation of the valve 1 can be caused by the raising of the lower sash 13 at various heights, while the valve will be operated immediately when the upper sash 14 is open.

Specifically the circuit closers 3 include, besides the contacts 5 and contact sleeves 9, movable pins 15 which slidably engage in the sleeves 9 and extend through and are insulated from the contacts 5 by suitable insulating plates 16. Contact discs 17 are carried by the pins 15 and these pins are urged outwardly by means of springs 18. The lower sash 13 is provided with a longitudinally extending groove 19 extending upwardly from this lower end, so that as the lower sash 13 is raised the groove 19 will move in alignment with the pin 15 of one of the circuit closers 3, permitting the spring 18 to force the pin 15 outwardly and move the disc 17 into engagement with the contact 5 thereby closing a circuit through the circuit closer and if the plug switch structure 8 is set to permit operation of the thermostat 2 by the said circuit closer 3 which has been operated, the current will be permitted to flow through the thermostat 2, causing heating of the thermostatic metal, by the resistance coil 20, which is coiled about the stem 21 of the thermostat 2, thereby operating the thermostat in the same manner in which it would be operated by the heating of the room to the necessary temperature. The operation of the thermostat 2 will in turn operate the valve 1 and cut off the passage of the heating fluid through the radiator 22. When the window is closed the circuit will be cut off and the thermostat 2 will be permitted to act in its usual manner for controlling operation of the valve 1, and if it is so desired, all of the circuit closers 3 may be cut out of circuit with the thermostat 2 to permit it to operate independently of the circuit closers.

In office buildings, hotels or the like where a number of windows are provided all of the switches on the same level, may be connected in a one wire arrangement, so as to permit control of the radiator valve by operation of anyone of the windows, and by connecting them up to the necessary thermostat in the one wire manner considerable expense is eliminated.

It is, of course, to be understood that the invention may be constructed in other manners and the parts associated in different relations and, therefore, I do not desire to be limited in any manner except as set forth in the claims hereunto appended.

Having thus described my invention what I claim is:

1. In a room having a radiator and a window, the combination of a valve for the radiator operated by opening of the window, and means for changing the point of window opening at which said valve is operated.

2. In a room having a radiator and a window, the combination of a valve for the radiator, means controlled by opening of the window for operating the valve, and means for changing the point of window opening at which said valve is operated.

3. In a room, the combination of a heat supply device, and a ventilating device, means controlled by the ventilating device when active to render the heat supply device inactive, and means for changing the point of activity of the ventilating device at which the heat supply device is rendered inactive.

4. In combination, a space to be heated, means for supplying heat to said space, a window for said space, means operated automatically with the opening of said window to cut off the heat supply to said space, and means for changing the point of window opening at which said means is operated to cut off said heat supply.

5. In combination, a space to be heated, means for supplying heat to said space, a window adjacent said space, electrically operable means for cutting off the heat supply to said space by opening of said window, and means for changing the point of the window opening at which said heat supply controlling means is operable.

6. In combination a heating device, a valve controlling said heating device, a ventilator, means controlled by the ventilator for operating said valve and means for changing the point at which said valve is operated by said ventilator controlled means.

7. In combination, a heating device, a ventilator, ventilator operated means controlling the heating device, and means for changing the point of operation of said ventilator operated means.

8. In a room having a radiator and a window, the combination of a valve for the radiator, a plurality of means rendered operative successively by the opening of the window controlling said valve, and means for rendering any of said first means inoperative at will.

9. In a room the combination of a heat supply device and a ventilating device, a plurality of means controlled by the ventilating device when rendered active to render the supply device inactive, and means for rendering part of said ventilator controlled means inoperative without rendering other of said means inoperative.

10. In a room having a radiator and a window, the combination of means controlling the radiator, said means including a circuit and a plurality of circuit closers along the window for successive operation thereby, and switch means for rendering part of said closers inoperative without rendering the others inoperative.

11. In a room, the combination of a radiator and a window, means controlled by opening the window for controlling the radiator, said means including an electric circuit and a plurality of independently operable circuit closers adjacent the windows.

12. In combination, a heat supply device, a ventilating device controlling said heat supply device, thermal means controlling said heat supply device with temperature changes, said thermal control means being arranged between the heat supply device and the ventilating device so that control of the heat supply device by the ventilating device will be effected therethrough.

13. In a room, the combination of a heat supply device, a ventilating device controlling said heat supply device, thermostatic means interposed between said ventilating device and said heat supply device and forming an operative connection through which the heat supply device is controlled by the ventilating device.

14. In combination, a heat supply device, a ventilating device, thermal means controlling the heat supply device with temperature changes, and a circuit controlled by the ventilating device, said circuit including a heating element adjacent said thermal controlling means.

15. In combination, a heat supply device, a ventilating device, thermal means controlling the heat supply device with temperature changes, and a circuit controlled by the ventilating device, said circuit including means controlling said thermal means.

16. In combination, a window, a radiator, thermal means controlling the radiator with temperature changes, and an electric circuit controlling said thermal means and controlled by the window to operate the radiator through said thermal means upon opening of the window.

In testimony whereof I affix my signature.

CHARLES C. McDERMOTT.

Certificate of Correction.

It is hereby certified that in Letters Patent No. 1,521,693, granted January 6, 1925, upon the application of Charles C. McDermott, of Chicago, Illinois, for an improvement in "Thermostatic Radiator Controls," errors appear in the printed specification requiring correction as follows: Page 1, line 76, after the word "controlled" insert the word *diaphragm;* same page, line 86, for the word "plug" read *selective;* same page, line 90, strike out the words "the plug switch structure 8, thereby" and insert instead *coil 20 of thermostat 2 of the selective switch structure 8,;* and that the said Letters Patent should be read with these corrections therein that the same may conform to the record of the case in the Patent Office.

Signed and sealed this 17th day of February, A. D. 1925.

[SEAL.]
KARL FENNING,
*Acting Commissioner of Patents.*